H. L. DANIELS.
Gang and Sulky Plow.

No. 199,622. Patented Jan. 29, 1878.

Witnesses:
P. C. Dieterich.
Wm. Upperman.

Inventor:
Horace L. Daniels.
Per C. H. Watson & Co. Attorneys

UNITED STATES PATENT OFFICE.

HORACE L. DANIELS, OF REDWOOD FALLS, MINNESOTA.

IMPROVEMENT IN GANG AND SULKY PLOWS.

Specification forming part of Letters Patent No. 199,622, dated January 29, 1878; application filed November 3, 1877.

*To all whom it may concern:*

Be it known that I, HORACE L. DANIELS, of Redwood Falls, in the county of Redwood and State of Minnesota, have invented certain new and useful Improvements in Gang and Sulky Plows; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a gang and sulky plow, as will be hereinafter more fully set forth.

Figure 1:
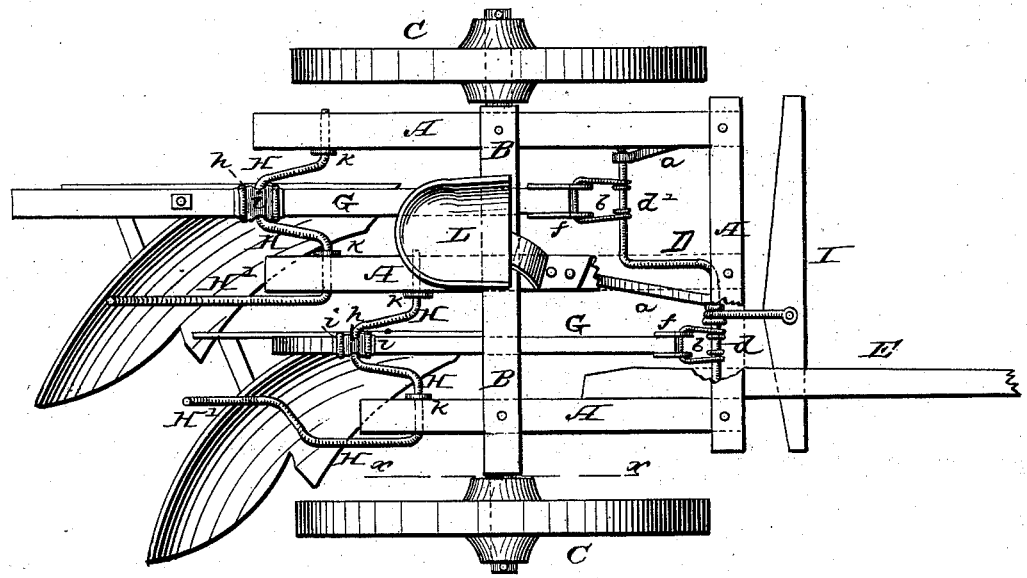
Figure 2:
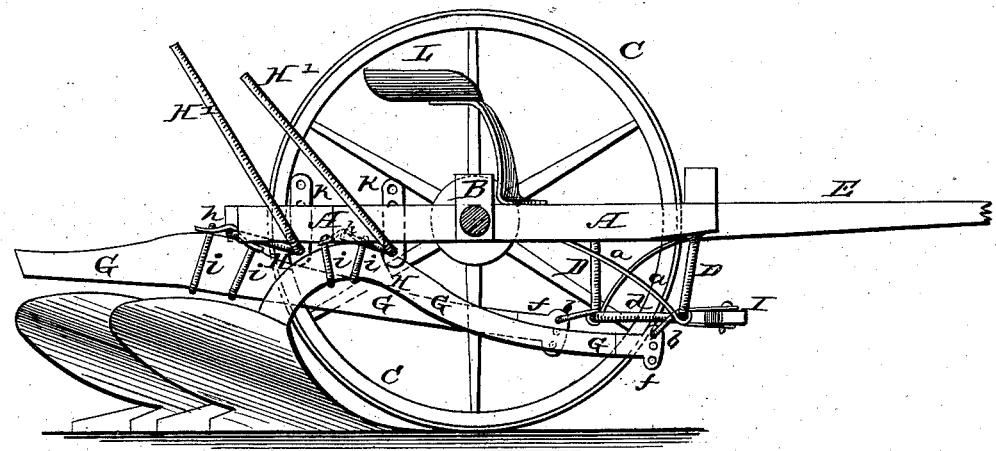

In the annexed drawing, to which reference is made, and which fully illustrates my invention, Figure 1 is a plan view, and Fig. 2 a longitudinal section on line $x\,x$, Fig. 1.

A represents the main frame, constructed in any suitable manner, and attached to the axle B, on the ends of which the wheels C C are placed. E is the tongue, attached to the main frame A near one side.

Below the main frame A, at the front end, is attached a bar or frame, D, which is so bent or constructed as to form two horizontal parts or bars, $d\,d'$, at the same distance below the main frame, but one in front of the other. This bar or frame D is further connected to the main frame A by means of arms or braces $a\,a$ running forward and backward, as shown.

G G represent two plow-beams, connected to the parts $d\,d'$ of the frame D by means of clips $b\,b$ pivoted on said parts or bars $d\,d'$, and passing through clevises $f\,f$, attached to the front ends of the plow-beams. These clevises are provided with several holes, so that the clips can be changed up and down therein, as required, to regulate the depth of the furrow.

Each plow-beam is connected to the rear part of the main frame A by means of a crank-shaft, H, held in a box or bearing, $h$, on top of the plow-beam, said box or bearing being fastened to the beam by clips $i\,i$. The ends of the crank-shaft H are placed in straps $k\,k$, which are fastened to the main frame A, and are adjustable up and down, so that they can be changed to raise and lower the crank-shaft, for the purpose of keeping the plow level.

These straps may either be provided with a series of holes for the passage of the fastening-bolts, so that by moving the bolts the straps can be adjusted up or down; or, instead of these holes, a longitudinal slot may be made in each strap, which would make it more easily adjustable.

On one end of each crank-shaft H is formed or attached a lever, H', by means of which the plow may be raised out of the ground when desired.

It will be noticed that by this construction I obtain perfect independence of action, neither plow in the gang being connected with the other. The lifting-lever H' for each plow is so arranged that when the plow is raised out of the ground the weight of the plow passes the center, and thereby locks itself, and no catch or ratchet of any sort being necessary to hold the plow up.

In this device any plow of any description may be used, whether iron or wood beam, simply removing the handles, but even that is not necessary, thereby making a gang or sulky plow for farmers out of the common hand-plow which he has on hand.

For sulky-plows the only difference is that the main frame is made narrower, and only one lifting-crank in the frame.

The evener I shown in the drawing is intended for three horses, and is connected to the front bar $d$ of the frame D in such a position that the line of draft will be directly opposite the ends of the plow-beams—that is to say, the point of attachment of the single-tree at the short end of the evener is opposite the end of one plow-beam, while the point of attachment of the double-tree on the long arm of the evener will be opposite the end of the other plow-beam.

The position of the whiffletrees will, of course, be changed if two or four horses are used instead of three; but in all cases the line of draft is on a line with the plow-beams.

L represents the driver's seat, arranged on top of the main frame A.

The lifting-levers H' H', it will be noticed, are arranged in such a manner that they extend up on one side of the seat L, and in close proximity thereto, so that the driver, while handling the reins with one hand, can with the other hand manipulate said levers in any manner required.

While I have only shown and described two plows connected to the frame, it is evident that any number of plows may be similarly arranged by simply enlarging the main frame and its attachments.

Having thus fully described my invention, what I claim as new, and desire to secure by Letters Patent, is—

The bent frame D, having braces $a$, clevises $f$, and clips $b$, and the sulky-frame, in combination with the beams G, draft-bar I, and operating-levers H H′, constructed and arranged substantially as and for the purpose set forth.

In testimony that I claim the foregoing as my own I have hereto affixed my signature in presence of two witnesses.

HORACE L. DANIELS.

Witnesses:
ROBT. WATSON,
DAVID M. THORP.